(12) United States Patent
Ouyang et al.

(10) Patent No.: US 8,693,823 B2
(45) Date of Patent: Apr. 8, 2014

(54) PHOTONIC CRYSTAL THREE-PORT CIRCULATOR WITH MULTIPLE SECOND AIR COLUMNS

(75) Inventors: Zhengbiao Ouyang, Guangdong (CN); Qiong Wang, Guangdong (CN)

(73) Assignee: Shenzhen University, Shenzhen (CN)

( * ) Notice: Subject to any disclaimer, the term of this patent is extended or adjusted under 35 U.S.C. 154(b) by 47 days.

(21) Appl. No.: 13/503,503

(22) PCT Filed: Nov. 29, 2010

(86) PCT No.: PCT/CN2010/079232
§ 371 (c)(1),
(2), (4) Date: Apr. 23, 2012

(87) PCT Pub. No.: WO2011/072573
PCT Pub. Date: Jun. 23, 2011

(65) Prior Publication Data
US 2012/0243844 A1      Sep. 27, 2012

(30) Foreign Application Priority Data

Dec. 14, 2009 (CN) .......................... 2009 1 0188884

(51) Int. Cl.
*G02B 6/42* (2006.01)
*G02B 6/00* (2006.01)

(52) U.S. Cl.
USPC ............................................ 385/27; 385/147

(58) Field of Classification Search
USPC .................. 385/14, 16, 50, 88, 129, 130–133
See application file for complete search history.

(56) References Cited

U.S. PATENT DOCUMENTS

| | | | |
|---|---|---|---|
| 7,305,161 B2* | 12/2007 | Zhou | 385/37 |
| 7,315,663 B2* | 1/2008 | Wu | 385/9 |
| 7,505,653 B2* | 3/2009 | Zhou | 385/37 |
| 2008/0267557 A1* | 10/2008 | Wang et al. | 385/16 |

* cited by examiner

*Primary Examiner* — Akm Enayet Ullah
(74) *Attorney, Agent, or Firm* — Jackson IPG PLLC

(57) ABSTRACT

Taught is a photonic crystal three-port circulator, which comprises a dielectric background material and a plurality of first air columns which are symmetrically arranged in the form of triangular lattice in the dielectric background material. The photonic crystal three-port circulator also comprises a magneto-optical cavity and three waveguides, wherein the magneto-optical cavity is arranged at the center of the photonic crystal three-port circulator; the three waveguides are symmetrically distributed around the magneto-optical cavity; and each waveguide comprises a waveguide port which is arranged at the position in the waveguide far away from the magneto-optical cavity. The photonic crystal three-port circulator realizes circular light transmission in single rotational direction from any one of the waveguide ports to another next to it, has a simple and compact structure, and can be easily integrated with other photonic crystal devices.

9 Claims, 3 Drawing Sheets

PHOTONIC CRYSTAL THREE-PORT CIRCULATOR WITH MULTIPLE SECOND AIR COLUMNS

FIELD OF THE INVENTION

The invention relates to a photonic crystal three-port circulator, in particular to a dielectric-substrate-air-column type photonic crystal three-port circulator.

BACKGROUND OF THE INVENTION

The increasing development of the modern all-optical information processing technology lays a solid foundation for the realization of optical circuit integrated chips. In 1987, E. Yablonovitch and S. John proposed the concept of photonic crystal. Later, photonic crystal is subjected to in-depth study continually and considered as one of the most potential photonic devices for realizing a new generation of all-optical integrated chips. Photonic crystal is a novel artificial material which is formed by the periodic arrangement of dielectric materials in space. Just like the fact that semiconductor materials can manipulate electrons, photonic crystal can control and operate photons as well. After 20 years' development, significant progress has been made in the aspects of the design and fabrication of photonic crystals. For example, high-performance optical reflectors, high-efficiency optical waveguides, ultra-narrow-band filters, highly-monochromatic lasers, fast all-optical switches and other optical devices, based on the photonic crystal structures. Photonic crystal devices have superior performances and small size, can be easily integrated with silicon-based materials in semiconductors, and have important application value in an all-optical information network.

Photonic crystal logic device has been a remarkable research hotspot in recent years and is highly likely to replace the currently widely used electronic logic devices in the near future. Photonic crystal logic functional devices such as "AND", "OR", "NOT" and "XOR" have been successfully designed, having the advantages of compact in structure, fast in arithmetic speed, capable of parallel operation, simplicity, etc., and being the basic elements for realizing all-optical logic operation. People are currently trying to explore the construction and optimization of more complex optical logic circuits such as photonic crystal comparators, photonic crystal A/D (D/A) converters and photonic crystal pulse generators. With the increase of the integration scale of the logic devices, the problem of mutual interference among components in an optical circuit has become more apparent. If this problem is not properly solved, the overall performances of the designed optical circuit can be greatly degraded, and normal logic functions cannot be even completed under severe cases. Magneto-optical circulator with non-reciprocity is a highly effective element for solving the problem as the magneto-optical circulator can realize low-loss transmission of light signals in the positive direction and high isolation of light signals in the opposite direction, can reduce optical crosstalk, and can improve the stability in signal transmission, thereby guaranteeing the normal operation of an optical integrated circuit system. However, being mainly based on bulky magneto-optical materials, the traditional magneto-optical circulator has large volume and thus is not suitable to be integrated with photonic crystal devices.

SUMMARY OF THE INVENTION

The invention aims to solve the technical problems of large volume and inapplicability in integration with photonic crystal devices, etc. in a magneto-optical circulator in the prior art, and provide a photonic crystal three-port circulator.

The specific technical proposal of the invention is as follows:

The invention provides a photonic crystal three-port circulator, which comprises a dielectric background material and a plurality of first air columns which are symmetrically arranged in the form of triangular lattice in the dielectric background material. The photonic crystal three-port circulator also comprises a magneto-optical cavity and three waveguides, wherein the magneto-optical cavity is arranged at the center of the photonic crystal three-port circulator; the three waveguides are symmetrically distributed around the magneto-optical cavity; and each waveguide comprises a waveguide port which is arranged at the position in the waveguide far away from the magneto-optical cavity. The photonic crystal three-port circulator realizes circular transmission of light incident from any of the waveguide ports, in single rotational direction.

Each waveguide comprises a waveguide port which is arranged at the position in the waveguide far away from the magneto-optical cavity. The photonic crystal three-port circulator realizes circular transmission of light incident from one waveguide port to another in single rotational direction according to the optical activity of the magneto-optical cavity.

The magneto-optical cavity comprises a magneto-optical material column and six first air columns which are distributed on the periphery of the magneto-optical material column, wherein the magneto-optical material column is formed by increasing the diameter of the first air column at the center of the photonic crystal three-port circulator, filling it with magneto-optical material, and applying a magnetic field in the direction (z axis) parallel to the axis of the magneto-optical material column.

The axes of three waveguides intersect at the center of the magneto-optical cavity; every two waveguides among the three waveguides are at an included angle of 120 DEG; and each waveguide is formed by filling the dielectric background material into first air columns on the same line.

The photonic crystal three-port circulator further comprises six second air columns, wherein every two second air columns are arranged at the position in each waveguide close to the magneto-optical cavity; and the diameter of the second air columns is less than that of the first air columns.

The photonic crystal three-port circulator further comprises third air columns and a plurality of fourth air columns, wherein a plurality of the third air columns and a plurality of the fourth air columns are arranged in turn between every two waveguides, close to the magneto-optical cavity, in increasing diameter; and the diameter of the third air columns is greater than that of the first air columns.

The incident light power is set to be 1; and a waveguide is in the light transmission state if the corresponding light power in the waveguide is more than 0.9, and is in the light isolation state if the corresponding light power in the waveguide is less than 0.05.

Compared with the prior art, the photonic crystal three-port circulator provided by the invention mainly has the advantages that:

The photonic crystal three-port circulator provided by the invention utilizes the optical activity of the magneto-optical cavity at the center of the photonic crystal three-port circulator to achieve the low-loss light transmission and high light isolation effects on different waveguides and to successfully realize circular transmission of light in single rotational direction among three waveguide ports. Moreover, the photonic crystal three-port circulator has a simple and compact structure, can be easily integrated with other photonic crystal devices, and plays an important role in the isolation of light signal crosstalk in the integration of photonic crystal logic devices, thereby guaranteeing the normal operation of an optical circuit system.

Furthermore, in the photonic crystal three-port circulator provided by the invention, two second air columns are arranged at the position in each waveguide close to the magneto-optical cavity. In the light transmission state, the second air columns have the function of coupling the magneto-optical cavity and the waveguides. In the light isolation state, the second air columns have the function of isolating the magneto-optical cavity and the waveguides. In addition, a plurality of third air columns and a plurality of fourth air columns are arranged between every two waveguides, close to the magneto-optical cavity. Due to the arrangement of a plurality of the third air columns and a plurality of the fourth air columns, the interference between the waveguides is reduced and the transmission efficiency of the waveguides is improved as well.

DETAILED DESCRIPTION OF THE PREFERRED EMBODIMENTS

The invention relates to a photonic crystal three-port circulator. Detailed description is given to the technical proposal of the invention with the attached drawings.

Figure 1:
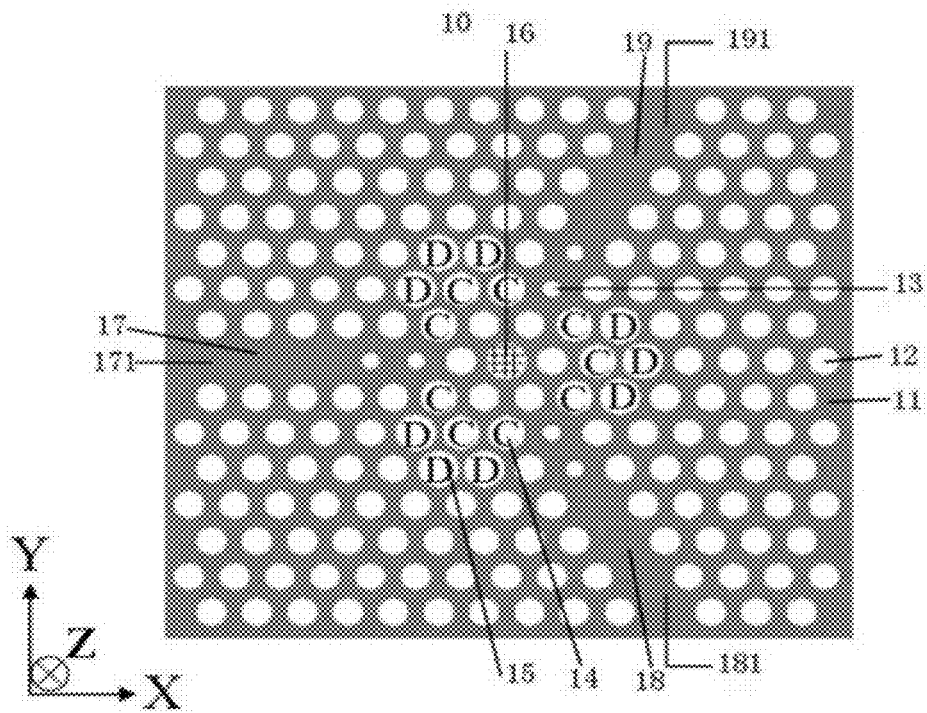
FIG. 1 is a cross sectional view of the photonic crystal three-port circulator provided by the invention.

As illustrated in FIG. 1, the invention provides a photonic crystal circulator 10, which comprises a dielectric background material 11, a plurality of first air columns 12, six second air columns 13, a plurality of third air columns 14 (air columns C), a plurality of fourth air columns 15 (air columns D), a magneto-optical cavity (not marked), a first waveguide 17, a second waveguide 18 and a third waveguide 19, wherein a plurality of the first air columns 12, the six second air columns 13, a plurality of the third air columns 14 and a plurality of the fourth air columns 15 are symmetrically arranged in the dielectric background material 11 in the form of triangular lattice; the magneto-optical cavity is arranged at the center of the photonic crystal three-port circulator 10 and comprises a magneto-optical material column 16 (marked by meshline) and six first air columns which are distributed on the periphery of the magneto-optical material column; the magneto-optical material column 16 is formed by increasing the diameter of the first air column at the center of the photonic crystal three-port circulator, filling it with magneto-optical material, and applying a magnetic field in the direction (z axis) parallel to the axial line of the magneto-optical material column; due to the six first air columns distributed on the periphery of the magneto-optical material column 16, the magneto-optical cavity is hexagonal; the cross sections of a plurality of the first air columns 12, the six second air columns 13, a plurality of the third air columns 14, a plurality of the fourth air columns 15 and the magneto-optical material column 16 can be circular, quadrilateral, pentagonal or hexagonal; and the dimensions of the six second air columns 13, a plurality of the third air columns 14 and a plurality of the fourth air columns 15 are adjusted accordingly for different cross sectional shapes.

The three waveguides 17, 18 and 19 are symmetrically distributed around the magneto-optical cavity, wherein the rotational symmetric distribution specifically refers to that axes of the three waveguides 17, 18 and 19 intersect at the center of the magneto-optical cavity, with the first waveguide 17 in the negative direction of the x axis, the second waveguide 18 in the negative 60 DEG relative to the direction of the x axis, and the third waveguide 19 in the positive 60 DEG relative to the direction of the x axis, namely every two waveguides among the three waveguides are at an included angle of 120 DEG Moreover, each waveguide is formed by filling the dielectric background material 11 into first air columns 12 on the same line. The length of each waveguide is na, wherein "n" is a natural number more than 2, namely the waveguide length is at least three lattice constants. When the waveguide length is increased, the function of circular light transmission in single rotational direction in the circulator remains the same. Each waveguide comprises a waveguide port, namely: the first waveguide 17 comprises a first waveguide port 171; the second waveguide 18 comprises a second waveguide port 181; and the third waveguide 19 comprises a third waveguide port 191. Each waveguide port is arranged at the position in each waveguide far away from the magneto-optical cavity.

Every two second air columns 13 are arranged at the position in each waveguide close to the magneto-optical cavity, and the diameter of the second air columns 13 is less than that of the first air columns 12. In the light transmission state, the second air columns 13 have the function of coupling the magneto-optical cavity and the waveguides. In the light isolation state, the second air columns 13 have the function of isolating the magneto-optical cavity and the waveguides. A plurality of the third air columns 14 and a plurality of the fourth air columns 15 are arranged in turn between every two waveguides, close to the magneto-optical cavity, with increasing diameter, i.e., the diameter of the air columns 15 is greater than that of the air columns 14; and the diameter of a plurality of the third air columns 14 is greater than that of the first air columns 12. The third air columns 14 and the fourth air columns 15 are used for reducing the interference between the waveguides and improving the transmission efficiency of the waveguides.

The technical proposal provided by the invention is based on the optical activity of the magneto-optical cavity in the photonic crystal three-port circulator 10 to achieve the low-loss light transmission and high light isolation effects in different waveguides. The principle of the optical activity of the magneto-optical cavity is as follows:

After the application of the magnetic field in the direction (z axis) parallel to the axial line of the magneto-optical material column, the dielectric parameters of the magneto-optical materials can be expressed by a three-dimensional tensor:

$$\bar{\varepsilon} = \begin{bmatrix} \varepsilon_{xx} & \varepsilon_{xy} & \varepsilon_{xz} \\ \varepsilon_{yx} & \varepsilon_{yy} & \varepsilon_{yz} \\ \varepsilon_{zx} & \varepsilon_{zy} & \varepsilon_{zz} \end{bmatrix} = \begin{bmatrix} \varepsilon_0 & i\varepsilon_a & 0 \\ -i\varepsilon_a & \varepsilon_0 & 0 \\ 0 & 0 & \varepsilon_0 \end{bmatrix} \quad (1)$$

wherein, the diagonal element $\varepsilon_0$ corresponds to the dielectric constant of the materials without an externally-applied magnetic field, and the nondiagonal element $\varepsilon_a$ corresponds to the magneto-optical effect intensity after the application of the external magnetic field. The intensity can be measured by the parameter $Q=\varepsilon_a/\varepsilon_0$. As for a photonic crystal with the magneto-optical materials, the eigenvalue of the magnetic field H can be obtained by solving the following eigenvalue equation:

$$\Theta|H\rangle = \nabla \times \bar{\varepsilon}^{-1} \nabla \times |H\rangle = \left(\frac{\omega}{c}\right)^2 |H\rangle. \quad (2)$$

wherein, parameters $\omega$ and c are respectively the angular frequency and the light speed.

In general, equation (2) can be specifically solved by using various numerical methods. In view of the fact that the actual value of the parameter Q is small, the optical activity of the magneto-optical photonic crystal can be explained by the use of the perturbation theory. The following equation is obtained by expanding equation (2) to a first-order term of the parameter $\varepsilon_a$:

$$\Theta|H\rangle = \nabla \times \frac{1}{\varepsilon_0} \nabla \times |H\rangle - \nabla \times \frac{\bar{\varepsilon}'}{\varepsilon_0^2} \nabla \times |H\rangle = \left(\frac{\omega}{c}\right)^2 |H\rangle \quad (3)$$

Wherein, $\Theta_0 = \Delta \times (1/\varepsilon_0)\Delta \times$ in equation (3) is used for describing the characteristics of a photonic crystal without the magneto-optical materials. The first air columns in the photonic crystal are symmetrically and periodically arranged in the form of triangular lattice in the dielectric background material of the photonic crystal. When one first air column is filled with the dielectric background material, a point defect cavity is formed in the photonic crystal. The point defect cavity, at specific angular frequency, can support two eigenmodes, namely an even-symmetry mode |e> and an odd-symmetry mode |o>. After introducing magneto-optical materials into the point defect cavity, the resulting magneto-optical effect can be considered as the result of the perturbation quantity $V = -\Delta \times (\bar{\varepsilon}^1/\varepsilon_0^2)\Delta \times$ in equation (3) applied to the two eigenmodes of |e> and |o>. The coupling function resulted from the eigenmodes of |e> and |o>, herein, can result in the rotational variation of the distribution mode of the magnetic field in the magneto-optical cavity, namely the optical activity of the magneto-optical cavity.

The operating principle of the photonic crystal three-port circulator provided by the invention is as follows: as for light waves with specific wavelength which are incident from one waveguide port, the rotation of the distribution mode of the magnetic field in the magneto-optical cavity can be realized through the optical activity of the magneto-optical cavity, so that the wave vector of light in the magneto-optical cavity has the effects of parallelism and deviation from the other two waveguides respectively, namely the wave vector in the cavity becomes parallel to one waveguide and deviated from the other. As a result, the waveguide parallel to the wave vector is in light-transmission state while the waveguide deviated from the wave vector is in light-isolation state. The function of circular light transmission in single rotational direction is guaranteed by the high rotational symmetry of the structure. The circular light transmission in single rotational direction specifically refers to that: light inputted from the first waveguide port 171 can only transmit to the second waveguide port 181, with the third waveguide port 191 in the isolation state; light inputted from the second waveguide port 181 can only transmit to the third waveguide port 191, with the first waveguide port 171 in the isolation state; and light inputted from the third waveguide port 191 can only transmit to the first waveguide port 171, with the second waveguide port 181 in the isolation state.

The invention provides a photonic crystal three-port circulator 10. Compared with the prior art, the photonic crystal three-port circulator mainly has the advantages that:

The photonic crystal three-port circulator 10 provided by the invention utilizes the optical activity of the magneto-optical cavity at the center of the photonic crystal three-port circulator to achieve the low-loss light transmission and high light isolation effects on different waveguides and to successfully realize circular transmission of light among three waveguide ports in single rotational direction. Therefore, the photonic crystal three-port circulator 10 provided by the invention has a simple and compact structure, can be easily integrated with other photonic crystal devices, and plays an important role in the isolation of light signal crosstalk in integrated photonic crystal logic devices, thereby guaranteeing the normal operation of an optical circuit system.

Moreover, in the photonic crystal three-port circulator provided by the invention, two second air columns 13 are arranged at the position in each waveguide close to the magneto-optical cavity. For corresponding states of light transmission and light isolation, the second air columns 13 have the functions of respectively coupling and isolating the magneto-optical cavity and the waveguides, thereby improving the transmission efficiency of the waveguides. In addition, a plurality of third air columns 14 and a plurality of fourth air columns 15 are arranged between every two waveguides, close to the magneto-optical cavity. Due to the arrangement of a plurality of the third air columns 14 and a plurality of the fourth air columns 15, the interference between the waveguides is reduced and the transmission efficiency of the waveguides is improved as well.

In a preferred technical proposal provided by the invention, gallium nitride (GaN) material is selected as the dielectric background material 11, and the refractive index of the material is 2.5. The lattice array of the photonic crystal three-port circulator 10 is 15×15; the lattice constant of the photonic crystal three-port circulator 10 is 1 μm; and the cross section diameter of the first air columns 12 is 0.72 μm. As for TM polarized waves (with the magnetic field in the z-axis direction), the forbidden band width of the photonic crystal three-port circulator, obtained by the use of the plane-wave expansion method, is ranged from the normalized frequency $a/\lambda=0.307$ to $a/\lambda=0.418$, wherein $\lambda$ represents the optical wavelength.

The diameter of the first air column at the center of the photonic crystal three-port circulator 10 is increased to 0.8 μm, namely the diameter of the magneto-optical material column 16 is 0.8 μm. Bismuth iron garnet (BIG) is selected as the magneto-optical material, and the diagonal element parameter $\varepsilon_0$ and the nondiagonal element parameter $\varepsilon_a$ of the magneto-optical materials are 6.25 and 0.0517, respectively.

Figure 2:
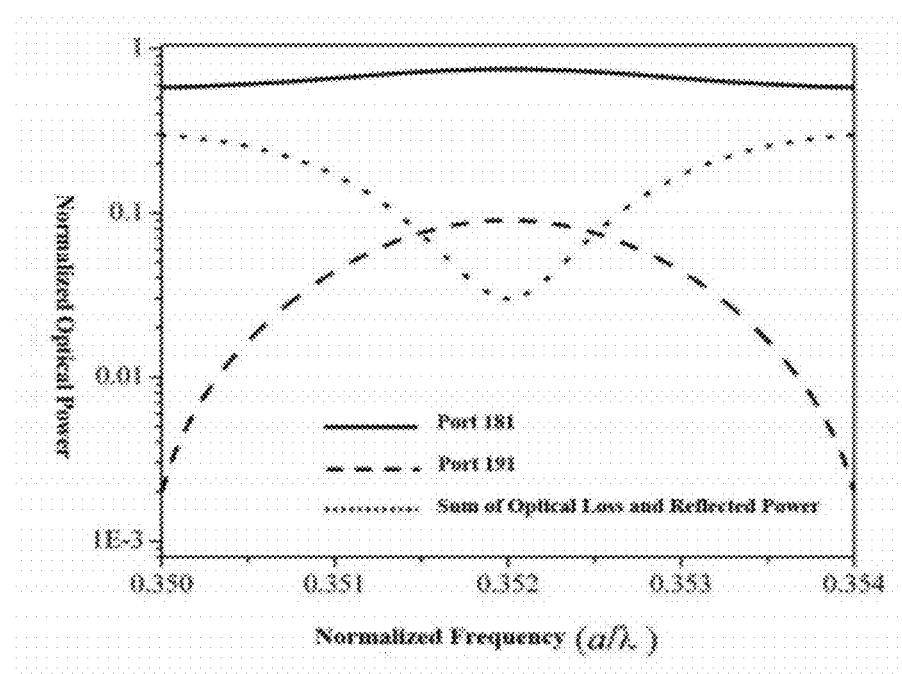
FIG. 2 is a spectrogram of the photonic crystal three-port circulator provided by the invention, wherein the solid line represents the light power transmitted to port 181; the dashed line represents the light power detected at port 191; and the dot line represents the sum of optical loss and reflected light power.

Furthermore, the structure parameters are optimized: light is incident from the first waveguide port 171; and light power detectors are arranged on the three waveguide ports to calculate and obtain the spectra of the corresponding light reflection power, light transmission power and light isolation power, respectively. The spectrogram, obtained by adjusting the diameters of three different kinds of air columns, namely the second air columns 13, the third air columns 14 and the fourth air columns 15, is illustrated in FIG. 2. As illustrated in the spectrogram, the optimum working frequency of the photonic crystal three-port circulator 10 is $a/\lambda=0.352$; the optimum operating wavelength of the photonic crystal three-port circulator 10 is $\lambda=(1/0.352)$μm, namely 2.841 μm; the maximum light power at the output waveguide port 181 is 93% of the input power accordingly; the sum of optical loss and reflected light power achieves the minimum of 3% of the input power; the light power at the isolating waveguide port 191 is 4% of the input power accordingly; and the diameters of the second air columns 13, the third air columns 14 and the fourth air columns 15 are 0.36 μm, 0.78 μm and 0.86 μm, respectively. Due to the rotational symmetry of the structure, the optimized parameters are also applicable to the cases of light launched from the second waveguide port 181 and the third waveguide port 191.

The working performances of the photonic crystal circulator are checked according to the parameters.

Figure 3:
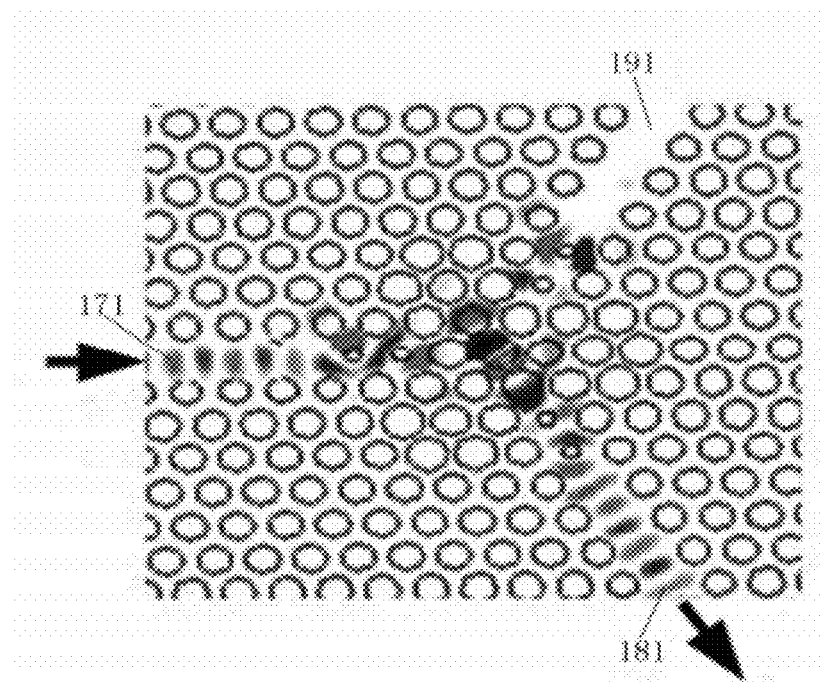
FIG. 3 is a light transmission diagram of the photonic crystal three-port circulator provided by the invention, wherein a first port is set as the incident port.

As illustrated in FIG. 3, light is incident from the first waveguide port 171. Due to the optical activity of the magneto-optical cavity, the wave vector of light in the magneto-optical cavity is rotated to the direction isolating the cavity from the third waveguide 19 and to the direction parallel to the second waveguide 18. Finally, the light transmits to the second waveguide port 181 with a transmitted light power of about 93% of the input power, and the third waveguide port 191 is in the isolation state with a transmitted light power of about 4% of the input power.

Figure 4:
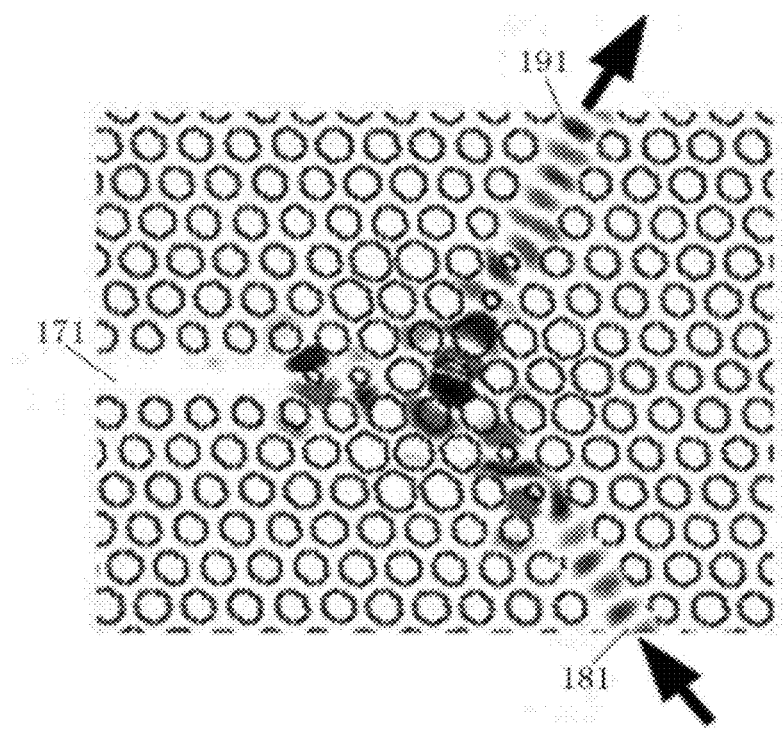
FIG. 4 is a light transmission diagram of the photonic crystal three-port circulator provided by the invention, wherein a second port is set as the incident port.

As illustrated in FIG. 4, light is incident from the second waveguide port 181. Due to the optical activity of the magneto-optical cavity, the wave vector of light in the magneto-optical cavity is rotated to the direction isolating the cavity from the first waveguide 17 and to the direction parallel to the third waveguide 19. Finally, the light transmits to the third waveguide port 191 with a transmitted light power of about 93% of the input power, and the first waveguide port 171 is in the isolation state with a transmitted light power of about 4% of the input power.

Figure 5:
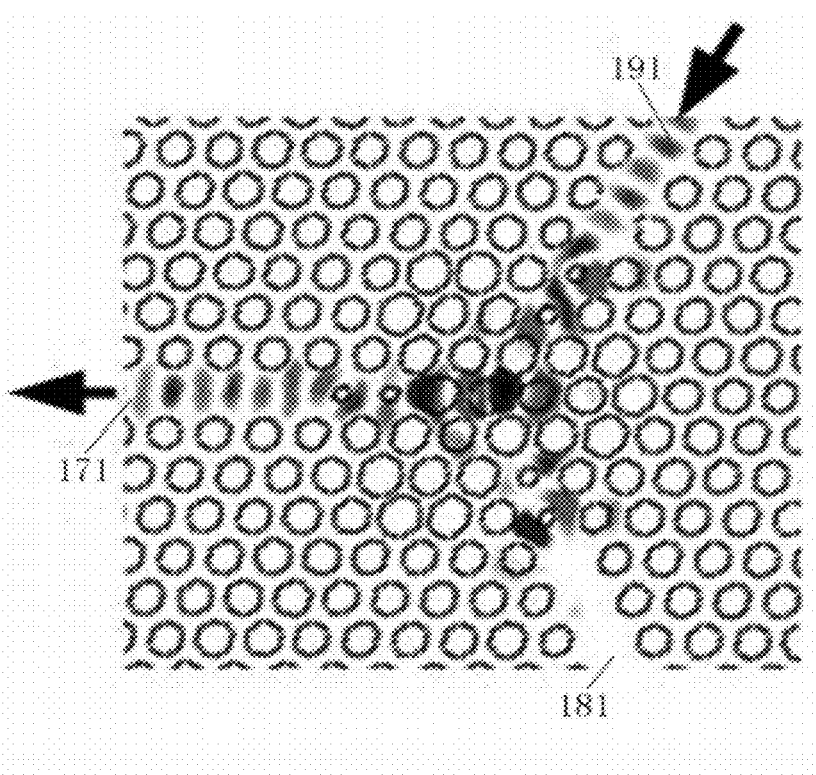
FIG. 5 is a light transmission diagram of the photonic crystal three-port circulator provided by the invention, wherein a third port is set as the incident port.

As illustrated in FIG. 5, light is incident from the third waveguide port 191. Due to the optical activity of the magneto-optical cavity, the wave vector of light in the magneto-optical cavity is rotated to the direction isolating the cavity from the second waveguide 18 and parallel to the first waveguide 17. Finally, the light transmits to the first waveguide port 171 with a transmitted light power of about 93% of the input power, and the second waveguide port 181 is in the isolation state with a transmitted light power of about 4% of the input power.

The photonic crystal three-port circulator provided by the invention achieves the function of circular light transmission in single rotational direction, namely incident light is transmitted from the first waveguide port 171 to the second waveguide port 181, from the second waveguide port 181 to the third waveguide port 191, and from the third waveguide port 191 to the first waveguide port 171. The ratio of the light power at the transmission waveguide port to that of the isolating waveguide port is 13.7 dB.

Other materials of which the functional properties are similar to that of the gallium nitride material can be selected as the dielectric background material, and other materials of which the functional properties are similar to that of the bismuth iron garnet materials can also be selected as the magneto-optical materials for filling the first air column.

The photonic crystal three-port circulator provided by the invention is not limited to the above implementations. It shall be understood by those skilled in the art that the photonic crystal three-port circulator provided by the invention is applicable to any electromagnetic wave band such as the microwave band, the millimeter wave band, the terahertz wave band, the infrared wave band and the visible light wave band, according to the technical proposal disclosed by the invention and according to the proportional scaling principle of the photonic crystal, namely the operating wavelength of the circulator is in proportional relationship with the parameters in the system such as the lattice constant of the photonic crystal, the dimension of the dielectric background material, the dimensions of the first air columns, the second air columns, the third air columns and the fourth air columns, and the dimension of the magneto-optical material column. The specific implementation is as follows: the operating wavelength $\lambda_1$ is given; the lattice constant $a_1=a(\lambda_1\lambda)=0.352\lambda_1$ is determined accordingly, wherein a and $\lambda$ representatively represent the lattice constant and the operating wavelength in the embodiment; and the parameters in the system such as the lattice constant of the photonic crystal, the dimension of the dielectric background material, the dimensions of the first air columns, the second air columns, the third air columns and the fourth air columns, and the dimension of the magneto-optical material column are subjected to proportional scaling to $(\lambda_1/\lambda)$ times of those in the embodiment. For a given operating wavelength of $\lambda_1=1.550$ μm, the corresponding lattice constant $a_1$ of the wavelength is 0.546 μm; the cross section diameter of the first air columns 12 is 0.393 μm; the diameter of the magneto-optical material column 16 is 0.437 μm; and the diameters of the second air columns 13, the third air columns 14 and the fourth air columns 15 are 0.197 μm, 0.426 μm and 0.470 μm, respectively. The circulator has the function of circular light transmission in single rotational direction under the operating wavelength of 1.550 μm, namely light incident from the first waveguide port 171 is emitted from the second waveguide port 181 with an emitted light power of about 93% of the input power, with the third waveguide port 191 being in the isolation state and having a light power of about 4% of the input power; light incident from the second waveguide port 181 is emitted from the third waveguide port 191 with an emitted light power of about 93% of the input power, with the first waveguide port 171 being in the isolation state and having a light power of about 4% of the input power; and light incident from the third waveguide port 191 is emitted from the first waveguide port 171 with an emitted light power of about 93% of the input power, with the second waveguide port 181 being in the isolation state and having a light power of about 4% of the input power.

What is claimed is:

1. A photonic crystal three-port circulator, comprising:
   a dielectric background material and a plurality of first air columns symmetrically arranged in the form of triangular lattice in said dielectric background material,
   wherein, said photonic crystal three-port circulator also comprises a magneto-optical cavity and three waveguides;
   wherein said photonic crystal three-port circulator further comprises six second air columns;
   every two said second air columns are arranged at the position in each said waveguide close to said magneto-optical cavity; and
   the diameter of said second air columns is less than that of said first air columns;

said magneto-optical cavity is arranged at the center of said photonic crystal three-port circulator;

said three waveguides symmetrically are distributed around said magneto-optical cavity;

each of said waveguides comprises a waveguide port arranged at the position in said waveguides far away from said magneto-optical cavity; and said photonic crystal three-port circulator transmits light from any one of said waveguide ports circularly to another next to it in single rotational direction.

2. The photonic crystal three-port circulator according to claim 1, wherein said magneto-optical cavity comprises a magneto-optical material column and six said first air columns which are distributed on the periphery of said magneto-optical material column; and said magneto-optical material column is formed by increasing the diameter of said first air column at the center of said photonic crystal three-port circulator, filling said air column with magneto-optical material, and applying a magnetic field in the direction parallel to the axis of said magneto-optical material column.

3. The photonic crystal three-port circulator according to claim 1, wherein the axes of said three waveguides intersect at the center of said magneto-optical cavity;

every two said waveguides among said three waveguides are at an included angle of 120 DEG; and each said waveguide is formed by filling said dielectric background material into said first air columns on the same line.

4. The photonic crystal three-port circulator according to claim 1, wherein said photonic crystal three-port circulator further comprises a plurality of third air columns and a plurality of fourth air columns, which are arranged in turn between every two said waveguides, close to said magneto-optical cavity, in increasing diameter; and the diameter of said third air columns is more than that of said first air columns.

5. The photonic crystal three-port circulator according to claim 1, wherein the length of the waveguide formed by being filled with said dielectric background material is na, wherein "n" is a natural number greater than 2.

6. The photonic crystal three-port circulator according to claim 1, wherein the cross sections of said first air columns, said second air columns, said third air columns and said fourth air columns, which are periodically distributed in said dielectric background material, and said magneto-optical material column, can be circular, quadrilateral, pentagonal or hexagonal.

7. The photonic crystal three-port circulator according to claim 4, wherein said dielectric background material with a low refractive index is filled into said first air columns, said second air columns, said third air columns and said fourth air columns of a photonic crystal.

8. The photonic crystal three-port circulator according to claim 2, wherein the length of the waveguide formed by being filled with said dielectric background material is na, wherein "n" is a natural number greater than 2.

9. The photonic crystal three-port circulator according to claim 2, wherein the cross sections of said first air columns, said second air columns, said third air columns and said fourth air columns, which are periodically distributed in said dielectric background material, and said magneto-optical material column, can be circular, quadrilateral, pentagonal or hexagonal.

* * * * *